UNITED STATES PATENT OFFICE.

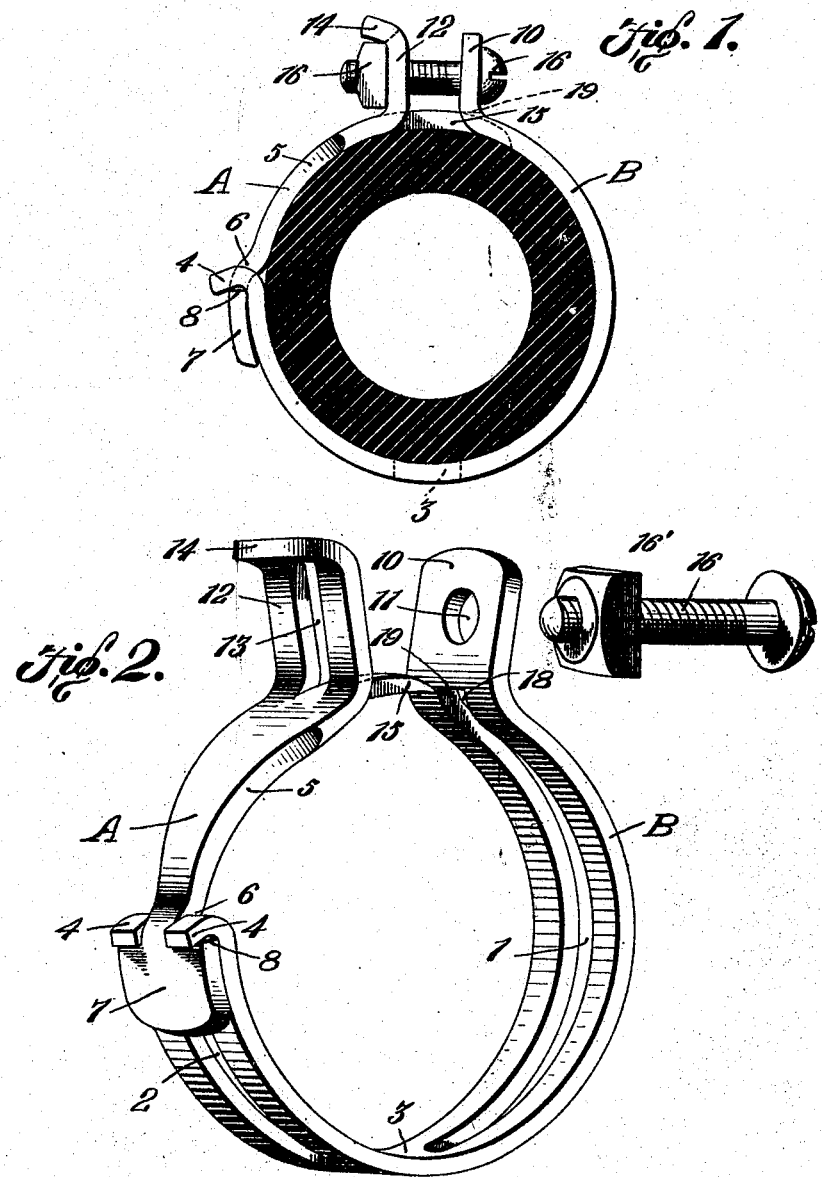

CHANNING M. THOMPSON, OF NEWARK, OHIO.

HOSE-CLAMP.

No. 847,620.     Specification of Letters Patent.     Patented March 19, 1907.

Application filed May 26, 1906. Serial No. 318,940.

*To all whom it may concern:*

Be it known that I, CHANNING M. THOMPSON, a citizen of the United States, residing at Newark, in the county of Licking and State of Ohio, have invented a new and useful Hose-Clamp, of which the following is a specification.

This invention relates to hose-clamps of the type described and claimed in my United States application, Serial No. 293,501, filed December 27, 1905.

The objects of the present invention are to improve and simplify the detachable securing means for the inner ends of the arcuate members of the clamp and to provide improved means for exerting a wedging action on the hose at the outer meeting ends of said arcuate members.

With the foregoing and other objects in view, which will appear as the description proceeds, the invention resides in the combination and arrangement of parts and in the details of construction hereinafter described and claimed, it being understood that I do not desire to be limited to the particular arrangement shown in the drawing, as changes therein may be made within the scope of the claims without departing from the spirit of the invention or sacrificing any of its advantages.

In the accompanying drawings, forming a part of this specification, Figure 1 is a transverse section through a hose having a clamp constructed in accordance with my invention. Fig. 2 is a perspective view of the improved clamp.

Like reference-numerals indicate corresponding parts in the different figures of the drawing.

The improved hose-clamp of this invention comprises a pair of segmental or arcuate members A and B, the member B preferably being longer than the member A, so as to embrace slightly more than half of the hose. The member B, which I shall term the "long" member, is formed, preferably, with a pair of longitudinal slots 1 and 2, which are separated from each other by a cross-piece 3, which serves to connect the portions of the member B on opposite sides of the longitudinal slots 1 and 2. The slots 1 and 2 preferably extend practically the entire length of the member B, so as to render the same more flexible than if it were solid and to decrease the amount of material necessary to be used.

The improved means which I have provided for detachably securing the members A and B together comprises a pair of hooks 4, which are formed integral with what I shall term the "inner" end of the member B and are located on opposite sides of the open-ended slot 2. As shown clearly in the drawing, the hooks 4 are disposed practically at a right angle to the adjacent portion of the member B and are slightly bent. This form of the hooks 4 constitutes an improvement over the hooks shown in my before-mentiond application, which are bent backwardly into parallelism with the adjacent portion of the member B, for the reason that the hooks herein shown require less material and are more readily engaged by the other member of the clamp than are the hooks in my former application. The member A is formed with a shank 5, which is gradually decreased in width or tapered, so that its inner end 6 is of a width equal to the distance between the hooks 4 of the member B—that is, the width of the portion 6 is about the same as the width of the slot 2 in the member B. The inner end 6 of the shank 5 is bent slightly outward, as shown, and is formed with an enlarged head 7, which extends beyond the end of the shank 5, as shown, and is offset outwardly therefrom by reason of the slight bend at 6. When the small end of the shank 5 is fitted between the hooks 4, the head 7 rests against the outer portion of the member B, said head 7 being formed with a pair of shoulders 8, which rest in engagement with the right-angular hooks 4 and serve to hold the two members A and B detachably together. The purpose in view in bending the shank 5 slightly outward, as shown at 6, is that it is desirable that the shank 5 shall form a continuation of the arc or circle of the member B and that the head 7 shall be located beyond the end of the shank 5 and slightly offset in an outward direction therefrom, so that it will not be necesary for the shank 5 to extend any distance into the slot 2. The arrangement of the slightly-curved hooks 4 at a right angle to the adjacent portion of the member B and the head located beyond and slightly offset from the shank 5 constitutes a simple and improved means of detachably securing together the inner ends of the members A and B.

At its outer end the member B is formed with an outwardly or radially extending ear 10, having an elongated perforation 11, and the member A is formed with a similar ear 12, having an elongated perforation or slot 13 and a rearwardly-bent flange 14, the slot 13 being formed, preferably, by stamping out an integral wedge-shaped tongue 15, which forms a continuation of the arc of the member A. These parts are of practically the same construction as shown in my former application and are for the purpose of receiving a bolt or other fastening device 16, the square end or nut of which is engaged by the rearwardly-bent flange 14, and thus held against rotation, so that the opposite end of said bolt can be engaged by a screw-driver for rotating the same, it being understood that the ears 10 and 12, together with the nut 16, constitute my preferred means of drawing together the outer ends of the members A and B, although I can, of course, use other equivalent means for accomplishing this result whenever required.

A further improvement of my present invention over my former construction consists in extending the slot 1 in the member B entirely to the outer end of said member, as indicated at 18, said outer end 18 of the slot 1 being partially closed by a shoulder 19, formed on the ear 10. When the outer ends of the members A and B are drawn together by the bolt 16, the forward end of the wedge-shaped tongue 15 enters the outer end of the slot 1 and slides along the shoulder 19, which partially closes said slot, the action of the shoulder being to cause the wedge-shaped tongue 15 to be forced hard down upon the periphery of the hose, so as to clamp the same securely and produce a portion of the circle formed by the members A and B. By extending the slot 1 in the manner described and by slightly closing the end thereof by the shoulder 19 it is possible to use a wedge-shaped tongue which is strong in construction and which is prevented by the slot 1 from becoming laterally bent or displaced after it enters and is guided forward in the slot 1.

The hose-clamp of this invention is strong, durable, and inexpensive in construction, as well as thoroughly efficient in operation.

What is claimed is—

1. A hose-clamp comprising a pair of arcuate members one member having a lug and a longitudinal slot terminating at the base of the lug, the other member being provided with a lug having a tongue stamped out therefrom and shaped to engage in the slot and under the lug of the first member, a bolt extending through the lugs of the members for drawing them together, and means on the members for connecting them together by a relative lateral movement at the ends opposite from those having the lugs, said means comprising radially-extending spaced hooks on one member, a head on the other member engaging under the hooks, and a portion adjacent the head extending between the hooks.

2. A hose-clamp comprising a pair of arcuate members, one having outwardly-projecting hooks and the other having a shank bent slightly outward to fit between the hooks, and a head extending beyond the shank and engaging the hooks.

3. A hose-clamp comprising a pair of arcuate members, one member having a lug and a longitudinal slot terminating at the base of the lug, the other member being provided with a lug having a tongue stamped out therefrom and shaped to engage in the slot and under the lug of the first member, and means extending through the lugs of the members for drawing the latter together.

4. A hose-clamp comprising a pair of arcuate members, one having a plurality of slightly-bent hooks arranged approximately at a right angle to the adjacent portion of the member, and the other having a shank and a head extending beyond and offset outwardly from the shank to engage the hooks.

In testimony that I claim the foregoing as my own I have hereto affixed my signature in the presence of two witnesses.

CHANNING M. THOMPSON.

Witnesses:
NORTON SUTER,
HARRY SCOTT.